United States Patent [19]

Knox et al.

[11] Patent Number: 4,491,778
[45] Date of Patent: Jan. 1, 1985

[54] MOTOR VARIABLE FREQUENCY DRIVE

[75] Inventors: Dick L. Knox; John M. Leuthen, both of Claremore, Okla.; Kevin W. Lockyear, San Jose, Calif.

[73] Assignee: Hughes Tool Company, Houston, Tex.

[21] Appl. No.: 604,445

[22] Filed: Apr. 30, 1984

Related U.S. Application Data

[63] Continuation of Ser. No. 313,043, Oct. 19, 1981, abandoned.

[51] Int. Cl.³ ............................................... H02P 5/40
[52] U.S. Cl. ..................................... 318/803; 318/811
[58] Field of Search ................................... 361/24–29, 361/31, 32; 363/37, 41, 43; 318/807–811, 803

[56] References Cited

U.S. PATENT DOCUMENTS

| | | | |
|---|---|---|---|
| 4,099,109 | 2/1978 | Abbondanti | 318/811 |
| 4,123,692 | 10/1978 | Gilmore | 318/811 |
| 4,290,108 | 9/1981 | Woehrle et al. | 318/810 |
| 4,292,577 | 9/1981 | Ceaser et al. | 318/811 |
| 4,348,734 | 9/1982 | Dougherty | 363/41 |

OTHER PUBLICATIONS

Mazur, T., "A ROM-Digital Approach to PWM-Type Speed Control of AC Motors", AN-733, Motorola 1974.

*Primary Examiner*—David Smith, Jr.
*Attorney, Agent, or Firm*—Robert A. Felsman; James E. Bradley

[57] ABSTRACT

A speed control for an AC motor varies the frequency and amplitude. The speed control includes a rectifier which converts the AC power supplied to negative and positive DC. A switch connects each power conductor leading to the motor with one of the DC voltages. The switches are switched on and off to provide alternately positive and negative voltage. Controls for the switches include an oscillator which provides pulses of frequency that can be varied. A binary counter counts the pulses from the oscillator and provides binary outputs. A memory unit provides a programmed output to the switches for each binary output received. In one embodiment, the amplitude is varied by comparing a triangular wave from the oscillator with the DC input level. Enabling pulses equal to the excess of the triangular wave over the DC input enable the memory unit. In another embodiment, the enabling pulses are provided to an amplitude switch which is cycled to vary the DC rail voltage.

3 Claims, 11 Drawing Figures

4,491,778

MOTOR VARIABLE FREQUENCY DRIVE

This application is a continuation of application Ser. No. 313,043, filed 10/19/81 now abandoned.

BACKGROUND OF THE INVENTION

This invention relates in general to means for varying the speed of an AC (alternating current) motor, and in particular to means for varying the frequency and amplitude of the power supplied to the motor.

Large volume submersible pumps typically are located thousands of feet into a well. The pump assembly includes a centrifugal pump which is driven by an AC motor mounted below it. The motors may range from 15 to 750 horsepower, thus require a large supply of power. Normally, 60 cycle, three phase power is supplied, with voltage phase-to-phase being 480 volts or more. Common rotational speeds of the motor are about 3500 rpm (revolutions per minute).

Most of these types of pumps are single speed pumps. Because of different viscosities, densities, well flowing characteristics and the like, it would be desirable to vary the speed of the motor.

One way in which to vary the speed is to vary the frequency of the power being supplied. Normally, the line power comes from a utility company, and cannot be changed from the standard 60 cycle per second. There are circuits that will convert the standard frequency to different frequencies. These circuits also change the amplitude in proportion to the frequency change for efficient operation of the motor. In the past, SCR circuitry (silicon controlled rectifier) has been used. One disadvantage of an SCR is that it will not switch off until the current drops to zero. This requires complex commutating circuitry, making these control systems expensive.

SUMMARY OF THE INVENTION

The control circuit of this invention first uses a rectifier to convert the AC three phase power supply into a DC (direct current) voltage. A FET (field effect transistor) is connected between the negative rail and one of the power conductors leading to the motor for each of the three phases. Similarly, three FET switches connect the positive rail to each of the three power conductors. These FET switches are switched on and off to produce a desired alternating current waveform of a selected frequency. Means are also employed to vary the amplitude in proportion to the frequency selected.

To accomplish these functions, a variable frequency oscillator is employed to provide pulses of frequency depending on the input selected. A binary counter counts these pulses up to a certain number, then repeats. For each count, the counter provides a binary output. A ROM (read only memory) receives the binary outputs and provides a programmed output for each of the FET switches to control the switching as determined by the frequency of the oscillator.

In the preferred embodiment, the ROM is programmed to provide a series of pulses of widths that have been selected to synthesize a sine wave. Consequently, during one half of a sine wave period, either the negative or the positive FET switch for that particular phase will be switched on and off numerous times and with various durations to synthesize one half of a sine wave. These pulses are averaged by an integrating circuit comprising an inductor and capacitor to provide a smooth waveform to the motor.

In the preferred embodiment, the oscillator provides a triangular wave of the same frequency as the pulses that drive the counter. This triangular wave is compared to a DC level that is proportional to the input to the oscillator. The difference between the DC level and triangular wave results in uniform pulses of widths in proportion to the frequency selected. In the preferred embodiment, these pulses enable the computer to provide its output pulses and determine the duty cycle of each output pulse. At the highest frequency, the ROM is fully enabled, and the series of pulses are at their maximum widths. At one half the maximum frequency, the enabling pulses will be one half their width, and will cut in half the width of each pulse in the sine wave series, thus reducing the total amplitude in proportion to the frequency selected.

In an alternate embodiment, the enabling pulses vary the DC rail voltage, rather than enable the computer. In another alternate embodiment, rather than a series of pulses of differing widths for synthesizing a sine wave, each FET switch is left on for the full period, thus providing a square wave to the motor. The amplitude of the square wave is varied by varying of the DC rail voltage with the enabling pulses.

BRIEF DESCRIPTION OF THE DRAWINGS

FIG. 11 illustrates schematically a series of pulses for enabling the read only memory.

DESCRIPTION OF THE PREFERRED EMBODIMENT

Figure 3:
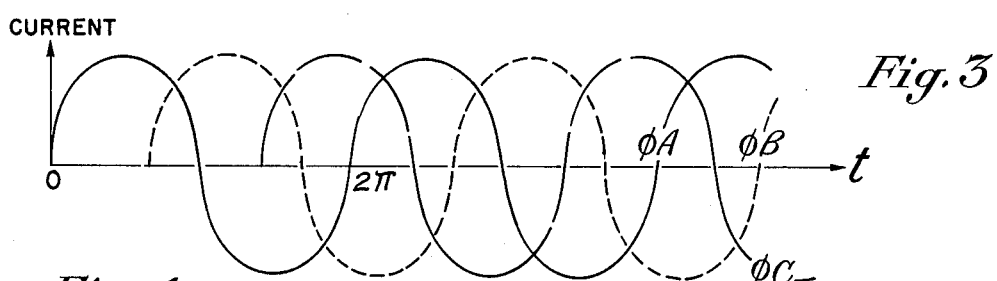
FIG. 3 illustrates a three phase AC current supply.

Referring to FIG. 3, power normally available at a well site is a three phase sinusoidal waveform, comprising Phase A, Phase B & Phase C, as indicated. Each phase alternates between positive and negative in a sine wave. Phase B is shown lagging Phase A by 120° and leading Phase C by 120°.

Figure 1:
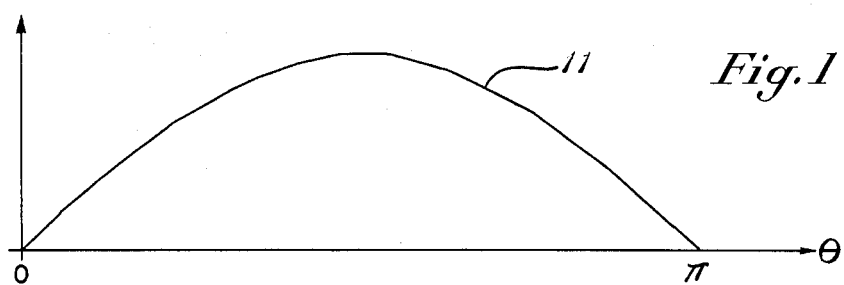
FIG. 1 represents the positive half of a sine wave.

Waveform 11 of FIG. 1 is one half cycle of one sine wave of FIG. 3. The area under waveform 11 at each particular point can be synthesized by the area under the series 13 of pulses shown in FIG. 2. The widths of the pulses are varied to provide the same area under waveform 11 at any particular point. Switching on and off a DC level to provide series 13 will synthesize a simulation of waveform 11.

Figure 2:
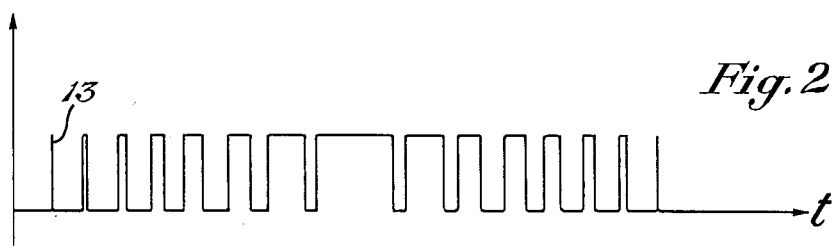
FIG. 2 portrays schematically a series of pulses for synthesizing the sine wave of FIG. 1.
Figure 4:
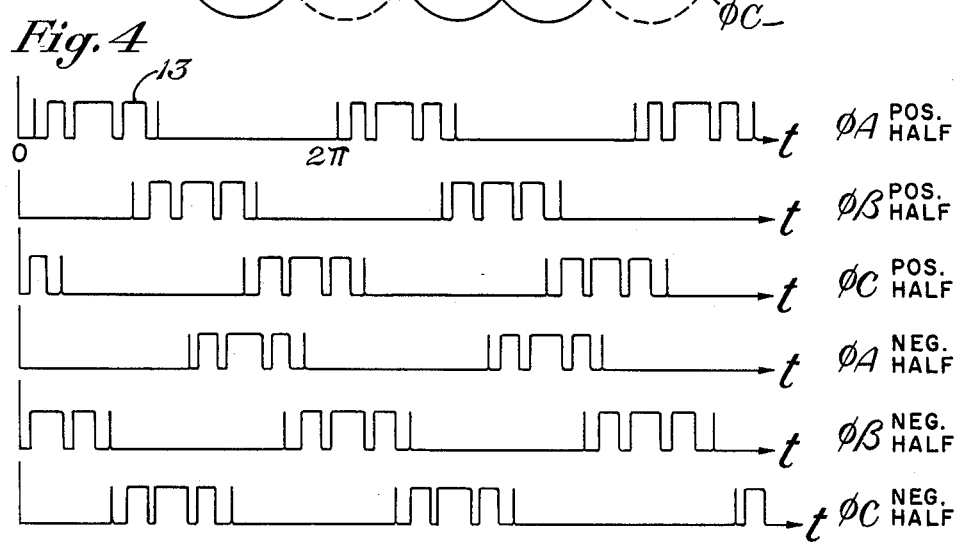
FIG. 4 illustrates schematically a series of pulses for each phase for synthesizing the three phase supply of FIG. 3.

As shown in FIG. 4, the positive half of Phase A can be synthesized by repeating the same series 13 of pulses as shown in FIG. 2, with an equal space between each series. The negative half of Phase A will have an identical series 13 of pulses when the positive half of Phase A is off. Phases B and C are synthesized similarly. The series 13 of pulses in Phase A lags those in Phase B by 120°. The series 13 of pulses of Phase C lags the series of Phase B by 120°. To increase the frequency, each series 13 is repeated at more frequent intervals. Each pulse in the series will be the same relative width to other pulses in the series regardless of the frequency.

In the preferred embodiment, the amplitude is varied in proportion to the change in frequency by proportionally changing the widths of each of the pulses in each series 13. At maximum frequency, all the pulses will be at their maximum widths. At one-half the maximum frequency, all of the pulses will reduced by one-half their widths. The off period between pulses doubles. This results in a reduction of the duty cycle, which is the cumulative amount that the pulses are on during one-half of a sine wave. Cutting the duty cycle reduces the total amplitude of the waveform 11 by the same factor. That is, if the pulses are cut in half for one half maximum frequency, the RMS (room mean square) amplitude of the waveform 11 will be one-half the maximum.

Figure 5:
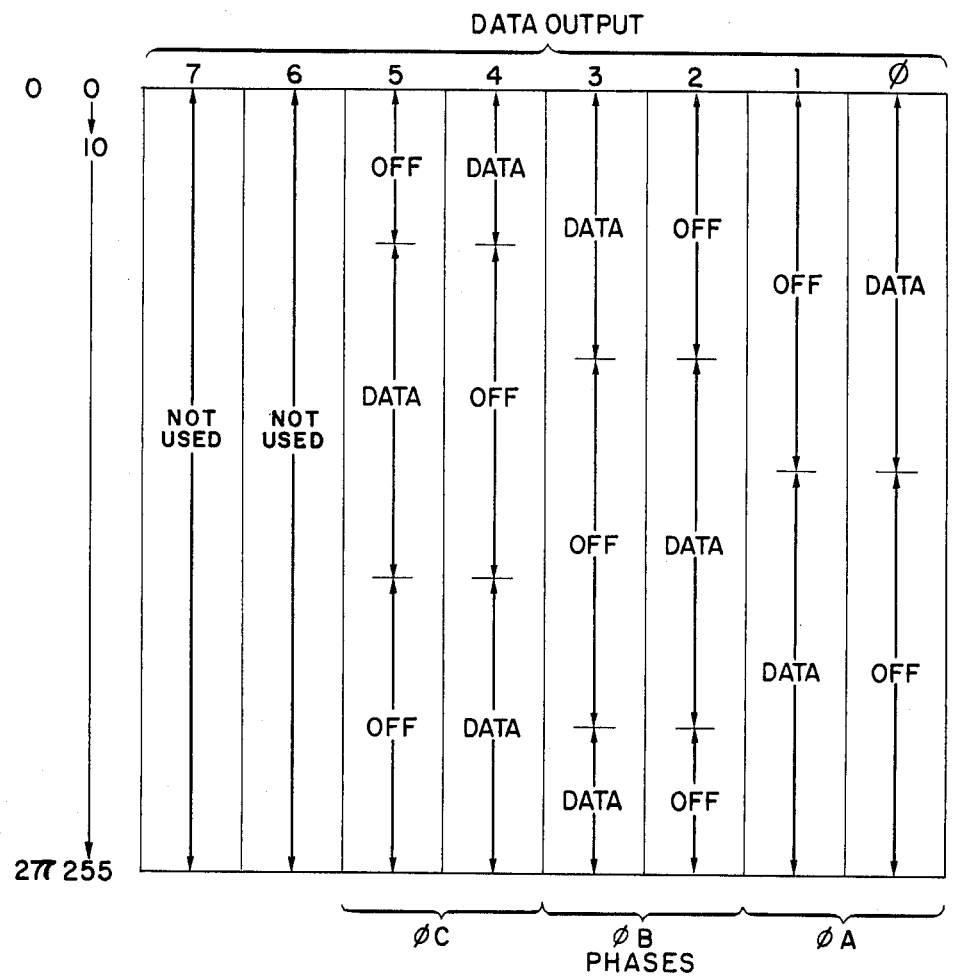
FIG. 5 illustrates schematically the data output of the ROM used with this invention for each binary input.

FIG. 5 illustrates how the pulses 13 are generated. Each of the six data outputs is connected to a negative or positive switch for supplying the motor power conductors with either negative or positive DC voltage. Memory outputs 0 and 1 represent the positive and negative portions of Phase A. Memory outputs 2 and 3 represent the positive and negative portions of Phase B, and memory outputs 4 and 5 represent the positive and negative portions of Phase C. On the left, the numbers 0 to 255 represent counts by a binary counter of pulses generated by a variable frequency oscillator. The 255 counts represent a full sine wave, 0 to $2\pi$. At each pulse, the counter will provide a binary number. For example, at the number 10 pulse, the counter will provide an eight bit binary number of 00001010. Each of these eight bits will address one of the eight gates (0 to 7) of the memory unit.

The memory unit, depending upon the 0 or 1 received, will provide a programmed output, which will be either a 0 or 1. For example, at the number 10, the data output on line 0, which is positive Phase A, could be either a 0 or 1 since it is in a data position or in the middle of providing a series 13 (FIG. 4) of pulses. The negative half of Phase A will be off at this point. The positive half of Phase B will be off. The negative half of Phase B will be on and could be either a 0 or 1 depending upon what point within a group of series 13 that the numeral 10 provides. The positive half of Phase C will be either 0 or 1, and the negative half of Phase C will be off. In this manner, six switches can convert DC into the three phase signal similar to FIG. 3.

Figure 6:
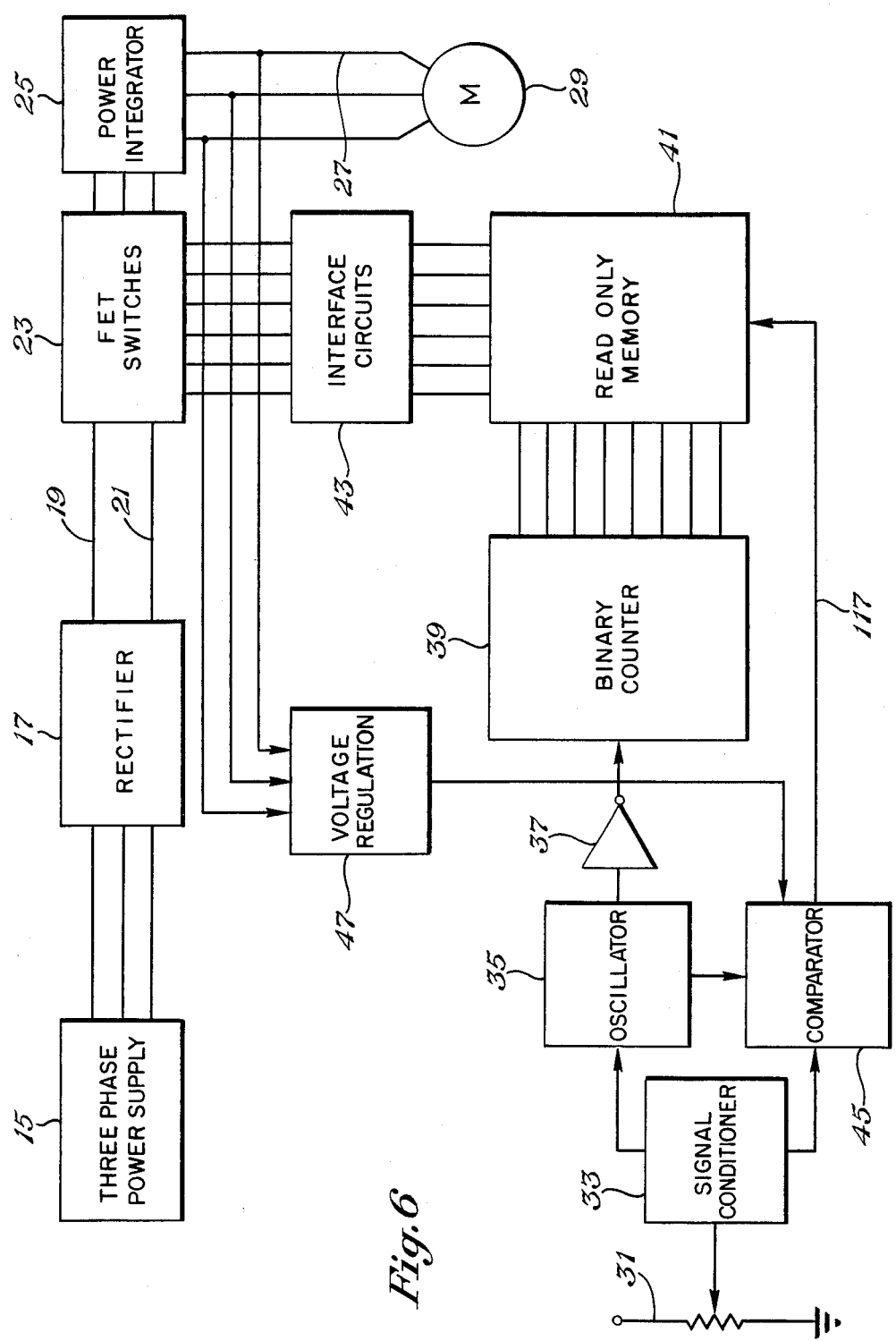
FIG. 6 is a block diagram illustrating one embodiment of this invention.

The overall block diagram for one embodiment is shown in FIG. 6. The three phase power supply 15 is normally the power received from the utility company, after transforming to the proper voltage, which is likely to be less than or equal to 480 volts AC phase-to-phase. This three phase power supply is rectified by rectifiers and filters 17 into a positive DC voltage on rail or line 19 and a negative DC voltage on negative rail 21. The FET switches 23 are alternately switched, as explained in connection with FIGS. 1-5, to provide the series 13 (FIG. 4) of pulses to a power integrator 25. Power integrator 25 integrates the pulses, averaging and smoothing them into an approximate waveform of that shown in FIG. 3. The three phase power is supplied through three power conductors 27 to a motor 29. Motor 29 is a three phase squirrel cage induction type motor.

The control circuitry for the FET switches 23 includes a speed control selector 31, shown to be a potentiometer, which provides varying voltage to a signal conditioner 33. The signal conditioner supplies a DC voltage to a voltage controlled oscillator 35. Oscillator 35 provides a square pulse output to an inverter buffer 37, which in turn provides the pulses for counting to a binary counter 39. Counter 39 counts the pulses from 0 to 255, then repeats. For each count, it provides an eight bit binary number to a programmable ROM 41. The ROM 41 provides 0 and 1 outputs on six lines, representing a programmed output for the particular pulse counted, to interface circuits 43. The interface circuits 43 provide a barrier between ROM 41 and FET switches 23, and also control FET switches 23.

To vary the amplitude in proportion to the frequency, the oscillator 35 also provides a triangular wave to a comparator 45. The triangular wave is of the same frequency as the square wave output from oscillator 35. Comparator 45 compares this triangular wave to a level DC input from the signal conditioner 33. Enabling pulses are provided to the ROM 41 that have widths equal to the portion of the triangular wave that is at a greater level than the DC level provided by signal conditioner 33. These enabling pulses are at the same frequency as the output pulses of the ROM 41, but have a duration or width that is proportional to the frequency.

The enabling pulses will enable the ROM 41 to provide a pulse for a series 13 (FIG. 4) only for the duration of the enabling pulse. If the DC signal from the signal conditioner 33 is at its lowest point, then enabling pulses are produced that are the full widths of the pulses from counter 39 and the ROM 41 will be enabled to produce full width pulses for series 13 (FIG. 4), resulting in maximum amplitude. Correspondingly, if the DC level from signal conditioner 33 is at one-half its maximum, then the enabling pulses provided to ROM 41 will be only one-half the widths of the pulses from counter 39, and will enable the ROM 41 to provide only output pulses for series 13 (FIG. 4) of one half the full width. Comparator 45 also receives an input from a voltage regulation circuit 47 that senses voltage from the three power conductors 27. Voltage regulation circuit 47 will modify the enabling pulses from comparator 45 if the final output amplitude has varied from that selected by speed control 31.

Figure 7:
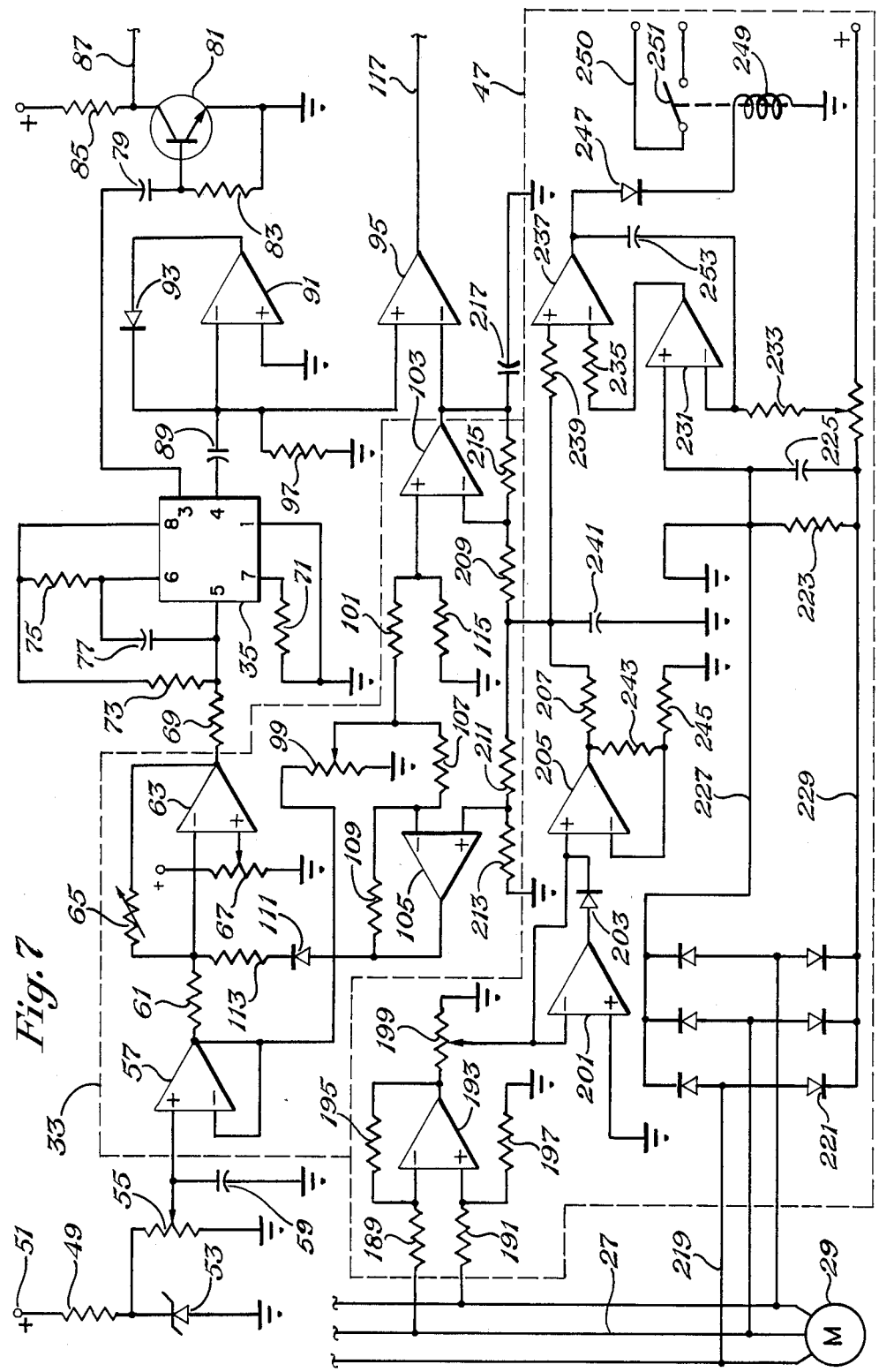
FIG. 7 is a electrical schematic illustrating part of the circuitry of the embodiment of FIG. 6.

FIG. 7 illustrates more details of the embodiment of FIG. 6. The speed control selector 31 (FIG. 6) includes a resistor 49 supplied with a source 51 of DC power. A zener diode 53 is connected between resistor 49 and ground for regulating the DC supply. A potentiometer 55 has one side connected between diode 53 and resistor 49 and the other side to ground. The wiper of potentiometer 55 is connected to the positive input of a differential amplifier 57, the input also being connected through a capacitor 59 to ground. Amplifier 57 provides gain control or level shifting for the DC input provided by potentiometer 55. This signal conditioner 33 portion of the circuit also includes a resistor 61 at the output of amplifier 57, which leads to the negative input of another amplifier 63. Amplifier 63 includes a trim resistor 65 connected in a line from its output to its negative input. The positive input of amplifier 63 is connected to a potentiometer 67, which is supplied with DC power.

The output of amplifier 63 leads to pin 5 of oscillator 35 through a resistor 69. Oscillator 35 is a conventional voltage controlled oscillator that is connected in a normal manner. Pin 7 is connected through a resistor 71 to ground, while pin 1 is grounded. Pin 8 is connected through a resistor 73 to pin 5. Pin 6 is connected through a resistor 75 to pin 8. Pin 6 is also connected through a capacitor 77 to pin 5.

Pin 3 of oscillator 35 provides a square wave 78 (FIG. 11) that depends upon the setting of potentiometer 55. Square wave 78 passes through a capacitor 79 to the base of a transistor 81. The emitter of transistor 81 is connected to ground, and the base of transistor 81 is connected to ground through resistor 83. The collector is connected to a DC power supply through a resistor 85. The square wave 78 (FIG. 11) from pin 3 will be amplified by transistor 81 and produced on line 87 leading from its collector. Line 87 leads to the binary counter 39, shown in FIGS. 6 and 8.

Oscillator 35 provides a triangular wave 88 (FIG. 11) on pin 4 with a frequency the same as square wave 78 (FIG. 11). Triangular wave 88 proceeds through a capacitor 89 to an amplifier 91. A diode 93 is connected from the output of amplifier 91 to its negative input. The positive input of amplifier 91 is grounded. The output of amplifier 91 leads to the positive input of a differential amplifier 95. The positive input of amplifier 95 is also grounded through a resistor 97.

The negative input of amplifier 95 receives a level DC that is proportional to the setting of potentiometer 55. This level DC proceeds through various stages in gain control circuitry that includes a potentiometer 99 connected to the output of amplifier 57. The wiper of potentiometer 99 is connected through a resistor 101 to an amplifier 103. The amplifier 103 is connected to the negative input of the comparator amplifier 95. Further conditioning for the level signal includes an amplifier 105 that has its negative input connected through a resistor 107 to the wiper of potentiometer 99. The negative input of amplifier 105 is connected to the output of amplifier 105 through resistor 109. The output of amplifier of 105 is connected through a diode 111 and a resistor 113 to the negative input of amplifier 63. The positive input of amplifier 103 is also grounded through a resistor 115. The negative input to amplifier 103 and the positive input to amplifier 105 are connected into voltage regulation circuitry 47, to be described subsequently.

The triangular wave 88 (FIG. 11) from pin 4 of oscillator 35 is thus supplied to the positive input of amplifier 95, while the negative input of amplifier 95 receives a level DC voltage depending upon the setting of potentiometer 55. The output waveform 125 on line 117 from differential amplifier 95 is shown in FIG. 11. The dotted line 123 represents a selected DC level that is applied to the negative input of amplifier 95. The resulting output of square enabling pulses 125 have a width that is the same as the excess amplitude of the triangular wave 88 over the DC level 123. Enabling pulses 125 will be at the same frequency as the square pulses 78 supplied to counter 39 (FIGS. 6 and 8), but will have variable pulse widths. At maximum frequency, the DC level 123 will be at its lowest point, providing pulses 125 that have widths equal to the spaces between each pulse 125 and equal to the widths of the square wave pulses 78. At one-half the maximum frequency, the DC level 123 will be higher, providing pulses 125 that have widths equal to one-half the distance between each pulse 125 and one-half the width of pulses 78.

Figure 8:
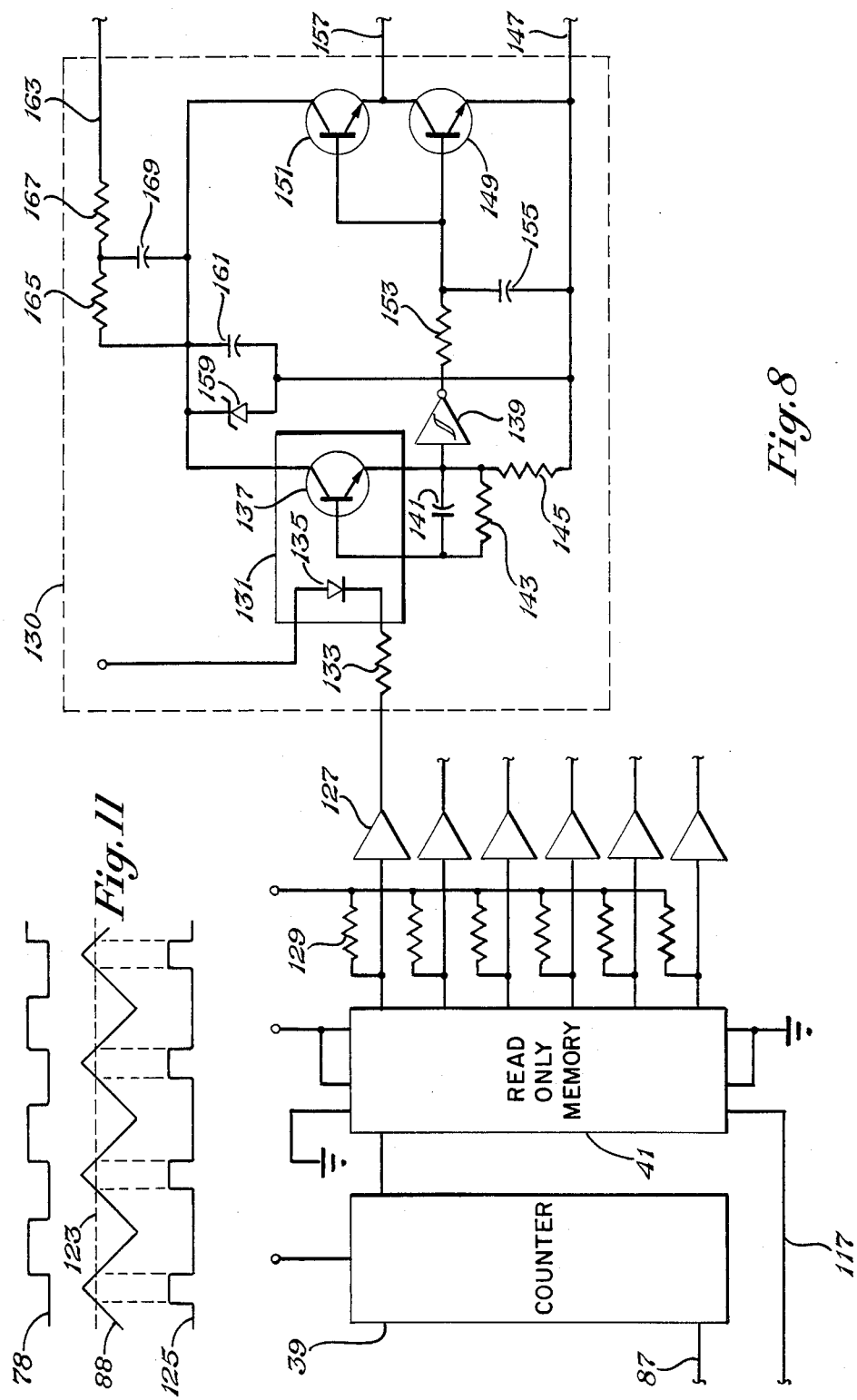
FIG. 8 represents a continuation of the electrical schematic of FIG. 7, illustrating another part of the circuitry of the embodiment of FIG. 6.

Referring to FIG. 8, line 87 from FIG. 7 transmits the square pulse output 78 (FIG. 11) and leads to counter 39. Line 117 transmits the enabling pulses 125 (FIG. 11) and leads to ROM 41. Counter 39 is supplied with power and provides the eight bit binary number to ROM 41. ROM 41 has six data outputs, each of which is connected to an amplifier 127 for shaping purposes. Each amplifier 127 is provided with a source of DC power at its input through a resistor 129.

Each amplifier 127 provides the data outputs of zeros and ones to an interface circuit 130, only one of which is shown, the other six interface circuits 130 being identical. Interface circuit 130 contains a conventional optical isolator 131 that is connected to the output of amplifier 127 by means of a resistor 133. Optical isolator 131 has a light emitting diode 135 connected to a source of DC power. Pulses cause the diode 135 to conduct and emit light for reception by a photo transistor 137. The base of transistor 137 will conduct upon reception of light from diode 135, thus isolating diode 135 from the higher power necessary for controlling the FET switches 23 (FIG. 6).

The remaining portions of the interface circuit 130 are of conventional nature and include a Schmidt trigger 139 connected to the emitter of transistor 137. A capacitor 141 is also connected to the input of Schmidt trigger 139. A resistor 143 is connected in parallel with capacitor 141. The input of Schmidt trigger 139 also is connected to a resistor 145 which leads to a line 147. The output of Schmidt trigger 139 is connected to the bases of a pair of transistors 149 and 151 through a resistor 153. The bases of the transistors 149 and 151 are also connected to line 147 through capacitor 155. The emitter of transistor 151 is connected to the collector of transistor 149, both of which are connected to a line 157. The emitter of transistor 149 is connected to line 147.

The photo transistor 137 has its collector connected to the collector of transistor 151 for receiving DC voltage. The collectors of transistors 137 and 151 are connected through a zener diode 159 and capacitor 161 to line 147. The collectors of transistors 137 and 151 are also connected to a line 163 through resistors 165 and 167 connected in series. A capacitor 169 leads from the junction of the two resistors 165 and 167 to the collectors of transistors 137, 151.

The interface circuits 130 receive pulses through amplifiers 127, which pulse the light emitting diode 135, causing transistor 137 to conduct, operating the Schmidt trigger 139. Pulses are produced on line 157 for controlling the FET switches 23 (FIG. 6). A potential will exist between lines 163 and 147.

Figure 9:
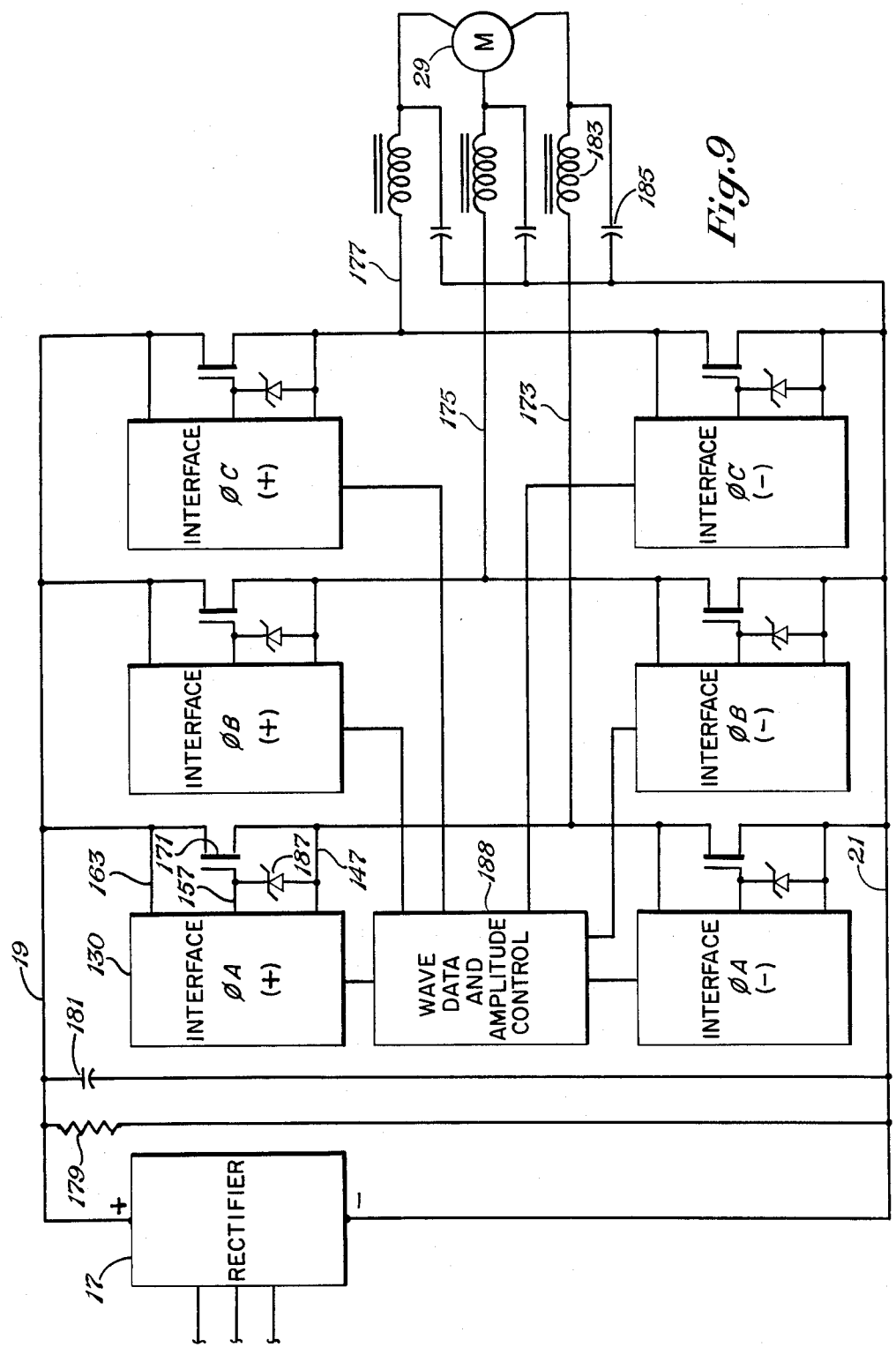
FIG. 9 is another block diagram further illustrating part of the embodiment of FIG. 6.

Referring to FIG. 9, each interface circuit 130 is shown with its output 157 leading to the gate of a FET switch 171. There are six FET switches 171, two for each of the three phases. Each of the positive FET switches 171 has its drain connected to the positive DC rail 19. Each of the negative FET switches has its source connected to the negative DC rail 21. The sources of the positive FET switches 171 are connected to the drains of the negative FET switches 171. The common connection of the positive and negative FET switches 171 for Phase A is connected to a line 173, for Phase B to a line 175, and Phase C to a line 177. One or more resistors and capacitors are connected between the rails 19, 21 for filtering, such as resistor 179, and capacitor 181.

Each output line 173, 175, and 177 has an inductor 183 connected into the line between it and motor 29. Each output line has a capacitor 185 with one lead connected to the negative rail 21 and the other lead connected one of the output lines between inductor 183 and motor 29. Each interface circuit 130 has its lines 147 and 163 connected across the source and drain of one of the FET switches 171. A zener diode 187 is connected across lines 147 and 157 of each interface circuit 130. Block 188 provides wave data and amplitude control to the interface circuits and represents the circuitry of FIGS. 7 and 8.

In operation, the AC three phase power is rectified by rectifier 17 into positive voltage on rail 19 and negative on rail 21. Referring also to FIGS. 7 and 8, setting potentiometer 55 controls the frequency of oscillator 35, which provides pulses to counter 39. Counter 39 addresses ROM 41 which provides a series 13 (FIG. 4) of pulses to each interface circuit 130. The "on" duration within each series 13 is controlled by enabling pulses received in ROM 41 from comparator amplifier 95. Each interface circuit 130 switches on and off its FET switch 171 with a series 13 (FIG. 4) of pulses.

When a FET switch 171 is provided with a series 13 of pulses, it will connect the respective positive or negative rails, 19 and 21, to the output lines 173, 175 and 177 leading to the motor. For example, if FET switch 171 for Phase A is being provided with pulses of varying width, it will pulse as shown in FIG. 4, each pulse sending positive DC voltage through DC rail 19 to output line 173. These pulses will be integrated by the power integrator comprising inductor 183 and capacitor 185. This averages and smoothes the pulsated series into a synthesized sine wave for driving the motor 29. While the FET switch 171 for the positive Phase A is pulsing, the FET switch 171 for the negative side of Phase A will be off.

Additional circuitry for monitoring the output and protecting against overload is shown in FIG. 7. The voltage regulation circuit 47 assures that the actual amplitude on power lines 27 is the proper selected amplitude. A pair of resistors 189 and 191 are connected to two of the power conductors 27 leading to motor 29. Resistors 189 and 191 lead to the inputs of an amplifier 193 for amplifying the AC between two of the phases. A resistor 195 leads from the output of amplifier 193 to its negative input. The positive input also is connected to ground through a resistor 197. The output of amplifier 193 is connected to a potentiometer 199, the wiper of which leads to the negative input of an amplifier 201. Amplifier 201 has its positive input grounded and its output connected to a diode 203. Diode 203 is connected to the positive input of an amplifier 205. The positive input of amplifier 205 is also connected to the negative input of amplifier 201. The output of amplifier 205 is connected to the negative input of amplifier 103 through resistors 207 and 209. The negative input of amplifier 103 is connected to the positive input of amplifier 105 through resistor 209 and a resistor 211. The positive input of amplifier 105 is grounded through a resistor 213. The negative input of amplifier 103 is grounded through a resistor 215 and capacitor 217 connected in series. The junction of resistor 215 and capacitor 217 is also connected to the output of amplifier 103.

The differential amplifier 193 senses the magnitude of the voltage between two of the phases at line 27, drops the voltage, amplifies and rectifies the signal for application to amplifier 103. Amplifier 103, as previously explained provides the DC level to the comparator amplifier 95. The DC level provided at the output of amplifier 205 to amplifier 103 shifts the DC level if the actual output has not been properly proportioned to the frequency selected.

Another portion of the circuit shown in FIG. 7 is a protection for overload. This portion of the circuitry is conventional and includes three lines 219, each of which is connected through a current transformer (not shown) to one of the power conductors 27 for monitoring current. Lines 219 lead to a rectifier comprising diodes 221 which provides positive and negative voltages filtered by a resistor 223 and capacitor 225 connected in parallel between the output lines 227 and 229. The DC voltage on lines 227 and 229 is compared with a preset DC voltage at the differential amplifier 231. The preset DC voltage is supplied through a potentiometer 233. The output from amplifier 231 proceeds through a resistor 235 to an amplifier 237. The positive input of amplifier 237 is connected to the output of amplifier 205 through a resistor 239. A capacitor 241 has one side connected between resistors 207 to 209 and the other to ground. The connection between resistors 207 and 239 also leads to the negative input of amplifier 103 through resistor 209. Amplifier 205 has its output connected through resistors 243 and 245 to ground. The negative input of amplifier 205 is connected to the junction of resistors 243 and 245.

Amplifier 237 provides an output through a diode 247 to a relay 249. Relay 249 has its contacts 251 connected into a line 250 for interrupting the power being supplied to the conductors 27 if the relay 249 is deenergized. The output line of amplifier 237 is also connected through a capacitor 253 to the negative input of amplifier 231.

In the operation of the overload protection, current is monitored through the lines 219, then rectified by diodes 221. If the current exceeds a preset amount through potentiometer 233, amplifier 231 will provide a positive output to the negative terminal of amplifier 237. A positive input at the negative terminal of amplifier 237 causes a negative output, which deenergizes coil 249, opening switch 251 to stop power to the motor.

Figure 10:
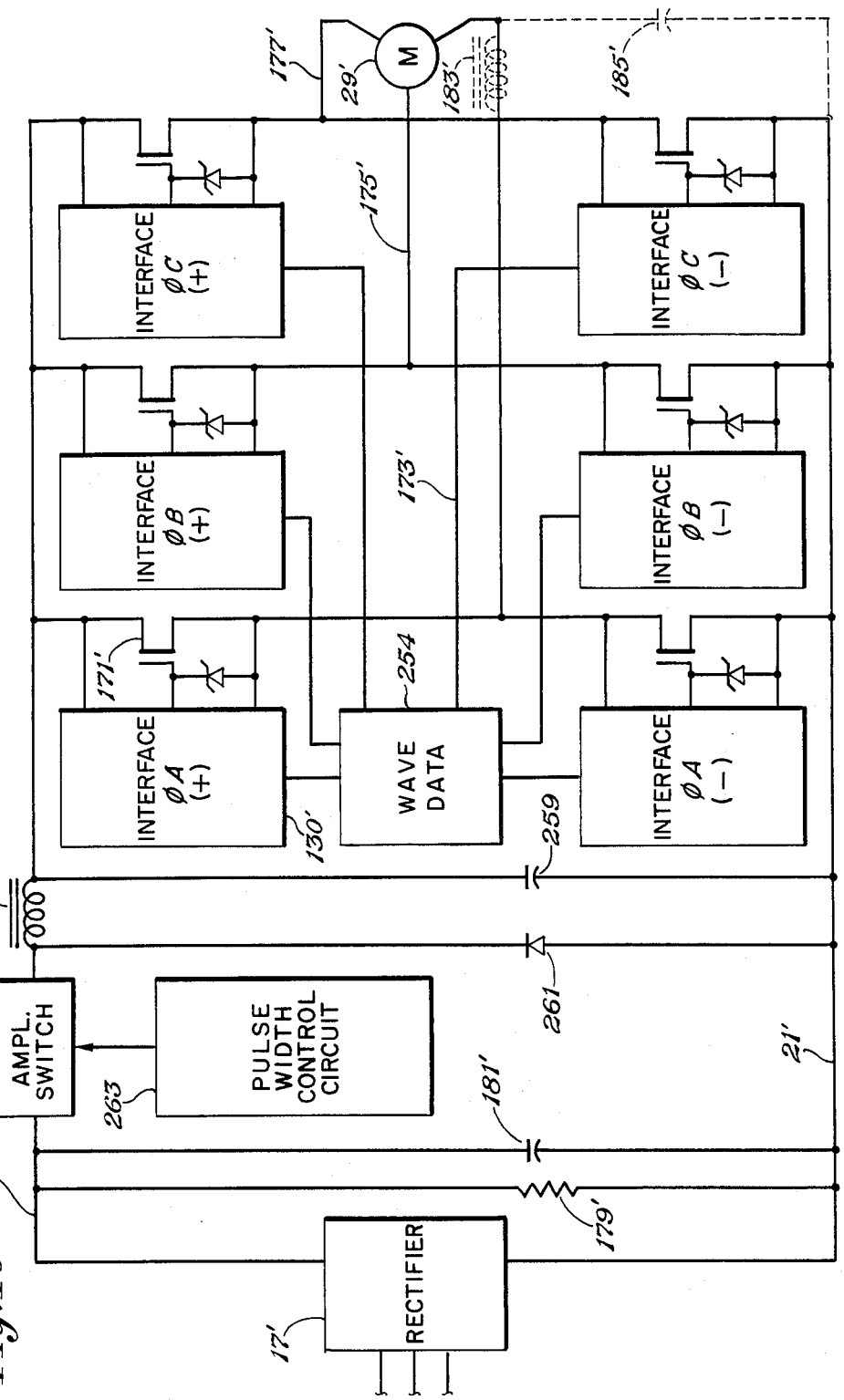
FIG. 10 is a block diagram illustrating another embodiment of the invention.

FIG. 10 discloses an alternate embodiment to the system shown in FIG. 9. Prime symbols will be used to indicate components in the circuit of FIG. 10 that are the same as in FIG. 9. As in FIG. 9, a rectifier 17' rectifies the three phase power supply from the utility transformer. This current is rectified into a positive DC voltage on rail 19' and a negative DC voltage on rail 21'. Resistor 179' and capacitor 181' provide filtering. An interface circuit 130' exists for each of the FET switches 171'.

In this second embodiment, the wave data block 254 may have the same components as the circuit of FIGS. 7 and 8. Rather than providing a series 13 (FIG. 4) of pulses of varying width to synthesize a sine wave, however, the ROM 41 (FIG. 8) is programmed to open and close each FET switch a single time for each half cycle of a sine wave. This provides a six step square wave output on lines 173', 175' and 177' to motor 29'. Since each FET switch 171' remains on or off for a full half cycle, the integration means comprising inductor 183 and capacitor 185 of FIG. 9 is not required between the motor 29' and FET switches 171. The frequency supplied to the motor 29' will, as in the first embodiment, be determined by the oscillator 35 (FIG. 7), which operates in the same manner. The counter 39 (FIG. 8) will also operate in the same manner. In the second embodiment, ROM 41 (FIG. 8) is always fully enabled and does not receive enabling pulses 125 (FIG. 11) on line 117.

In the second embodiment, to vary the amplitude in proportion to the frequency, an amplitude switch 255 is placed in one of the rails, such as the positive rail 19'. Amplitude switch 255 is switched on and off to provide a square wave output, with the widths of the pulses being variable with respect to the distance between pulses, similar to the enabling pulse waveform 125 of FIG. 11. An inductor 257 is connected into positive rail 19'. A capacitor 259 is connected between rail 19' and rail 21'. A diode 261 is connected between the rails 19' and 21'. Inductor 257 and capacitor 259 integrate the square wave provided by the amplitude switch 255 to provide a variable DC voltage between the rails 19' and 21'. The difference in potential depends upon the on duration of the amplitude switch 255 with respect to the off duration.

Amplitude switch 255 is controlled to vary the amplitude of the DC rail voltage in proportion to the frequency selected by a pulse width control circuit 263. The pulse width control circuit 263 is the same portion of the circuit shown in FIG. 7 that provides enabling pulses 125 (FIG. 11) on line 117 to the ROM 41 shown in FIG. 8. Referring to FIG. 7, as previously explained, the triangular wave 88 (FIG. 11) is generated on pin 4 of oscillator 35. Triangular wave 88 is then compared to a DC level 123 (FIG. 11) that is supplied through potentiometer 55 and various level shifting circuitry to amplifier 95. The portion of the triangular wave 88 that exceeds the DC level 123 in amplitude provides a square pulse 125 (FIG. 11), the width of which is less than the width between the pulses for less than the maximum frequency. In the first embodiment, these square pulses 125 are provided to the ROM 41 for enabling. In the second embodiment, the same pulses 125 are provided to the amplitude switch 255 (FIG. 10) for reducing the magnitude of the DC rail voltage in proportion to the frequency selected.

In the first embodiment (FIGS. 6-9), a synthesized sine wave is generated by varying the widths of the pulses in series 13 (FIG. 4). The amplitude is varied by enabling the ROM 41 to provide pulses for series 13 of widths in proportion to the frequency selected, thereby reducing the amplitude for frequencies less than maximum frequency. In the second embodiment (FIG. 10), a square wave is provided by closing each FET switch 171' open for the full half of each period. Amplitude is varied by varying the rail voltage through the same enabling pulses that were previously used to enable the ROM 41.

These two embodiments can be combined into third and fourth embodiments. In the third embodiment, pulses are provided for synthesizing a sine wave as in FIG. 9. Rather than using the enabling pulses to enable the memory unit, the enabling pulses are provided to the amplitude switch 255. This system would appear as shown in FIG. 10, but would require the addition of the power integrating circuit for each conductor. The dotted lines indicate the inductor 183' and capacitor 185' required for integrating the pulses produced during each period by the FET switches 171'. Inductor 183' and capacitor 185' are shown only for the Phase A conductor 173', however, similar inductors and capacitors would be required for each phase, as indicated in FIG. 9.

In the fourth embodiment, ROM 41 (FIG. 8) is programmed to provide the series 13 pulses of FIG. 4 at a certain frequency range in which a sine wave more efficiently operates the motor. At higher frequencies, where a square wave may be more efficient, the ROM provides square pulses, each of duration equal to one half of a cycle. In both of these cases, the amplitude would be varied by using the amplitude switch 255 and pulse width control circuit 263 as shown in FIG. 10. This fourth embodiment is also illustrated by FIG. 10.

In this invention, the rectifier 17 serves as rectifying means for converting the AC voltage supplied by the power source to DC voltage. The FET switches 171 serve as switch means for alternately providing negative and positive DC voltage to the power conductor. Oscillator 35 serves as oscillator means for supplying pulses of frequency which can be varied to select a desired motor speed. Counter 39 serves as counter means for repeatedly counting the pulses to a selected number and providing a binary output for each pulse counted. ROM 41 serves as memory means for providing a programmed output to the FET switches 171 for each binary output received. In the first embodiment selectively enabling ROM 41 provides means for varying the amplitude of the waveform in proportion to the frequency.

The pulse width control circuit 263 and the amplitude switch 255 of FIG. 10 in the second embodiment provide means for varying the amplitude of the waveform in proportion to the frequency. The interface circuit 130 of FIG. 8 discloses interface means for receiving the pulses from the memory 41 and controlling each switch 171 in response thereto. Inductor 183 and capacitor 185 (FIG. 9) disclose integration means for integrating the pulses created by the opening and closing of the switches 171 to produce a smooth waveform.

More specifically, comparator amplifier 95 of FIG. 7, the triangular wave being produced from the oscillator 35 and the associated circuitry for providing a DC level to the amplifier 95, serve as enabling means for changing the width of each pulse in each series by a factor equal to the frequency selected over the maximum motor frequency. The amplifier 95 serves as differential amplifier for receiving the triangular wave from the oscillator 35 and a DC input in proportion to the DC level applied to the oscillator, for producing enabling pulses of width equal to the width of the triangular wave in excess of the Dc input.

In connection with the second embodiment, the amplitude switch 255 serves as amplitude switch means for switching on and off the DC voltage. The triangular wave from oscillator 35 and the various circuitry associated with comparator amplifier 95 serve as pulse width means for providing amplitude pulses of width proportional to the frequency of the oscillator and for actuating the amplitude switch 255 with the amplitude pulses to vary the DC potential between the rails. In the second embodiment, the inductor 257 and capacitor 259 serve as integration means between the amplitude switch 255 and the motor 29' for integrating the pulses created by the amplitude switch 255.

All of the various components making up the circuits are conventional. Amplifiers 95, 231 and 237 are preferably LM 339 amplifiers, and the rest of the amplifiers are preferably LM 324 amplifiers. Counter 39 is preferably a CD 4040 counter, ROM 41 a 2716 eraseable ROM, oscillator 35 a LM 566 oscillator and optical isolator 131 a 6N136 circuit.

The invention has significant advantages. It provides speed control of an AC motor without the need for using SCR circuitry. The frequency can be varied over a wide range, with the amplitude being varied in proportion to the frequency change. Both three phase since wave and six step square waveforms can be generated. If desired, the circuit will generate a sine wave at start up, then automatically switch to a square wave at higher frequencies. Large energy storing devices that were necessary in prior art systems are not required. The system can be used with very high power motors.

While the invention has been shown in only a few of its forms, it should be apparent to those skilled in the art that it is not so limited but is susceptible to various changes and modifications without departing from the spirit of the invention.

We claim:

1. Means for varying the speed of a motor powered through power conductors by a three phase AC power source, comprising in combination:
   rectifying means for converting the AC voltage supplied by the power source to positive DC voltage on a positive rail and negative DC voltage on a negative rail;
   three positive switches, each connecting the positive rail to one of the power conductors;
   oscillator means for supplying pulses of frequency which can be varied to select a desired motor speed;
   counter means for repeatedly counting the pulses to a selected number and providing a binary output for each pulse counted;
   memory means connected between the counter means and an interface circuit means of each of the switches for isolating voltages on the rails from the memory means, the memory means being programmed to directly control and determine entirely the state of each of the switches in a full waveform by providing a programmed output directly to each interface circuit means for each binary output received from the counter means; and
   means for varying the amplitude of the waveform produced in proportion to the frequency selected.

2. Means for varying the speed of a motor powered by a three phase AC power source, comprising in combination:
   rectifier means for converting AC voltage supplied by the power source to positive DC voltage on a positive rail and negative DC voltage on a negative rail;
   a pair of switches for each phase, one connecting the positive rail to a power conductor to the motor, the other connecting the negative rail to the power conductor;
   oscillator means for supplying pulses of a frequency which can be varied by changing the level of a DC input and for supplying a triangular wave;
   counter means for repeatedly counting the pulses to a selected number and providing a binary output for each pulse counted;
   differential amplifier means for comparing a triangular wave with a DC level proportional to the DC input applied to the oscillator means, and for producing enabling pulses of widths equal to the width of the triangular wave that exceeds the DC level;
   memory means, having an output for each switch, for providing in response to the binary outputs a repetitive series of pulses, the pulses in each series having differing widths programmed so that each synthesizes one-half of a sine wave;
   the memory means being enabled by the enabling pulses to produce a pulse only during the width of each enabling pulse; and
   integration means between the switches and the motor for integrating the pulses created by the opening and closing of the switches to produce a smooth waveform.

3. Means for varying the speed of a motor powered through power conductors by an AC power source, comprising in combination:
   rectifying means for converting AC voltage supplied by the power source to DC voltage with a negative rail and a positive rail;
   frequency switch means having a negative and a positive switch connecting the negative rail and the positive rail, respectively, with each conductor, for alternately supplying negative and positive voltage to the motor;
   oscillator means for supplying pulses of frequency which can be varied to select a desired motor speed;
   counter means for repeatedly counting the pulses to a selected number and providing a binary output for each pulse counted;
   memory means connected between the counter means and an interface circuit means of each of the switches for isolating voltages on the rails from the memory means, the memory means being programmed to directly control and determine entirely the state of each of the switches at any given point in a full waveform by providing a programmed output directly to each interface circuit means for each binary output received from the counter means;
   amplitude switch means connected into one of the rails for switching on and off the DC voltage; and
   pulse width means for providing amplitude pulses of duration proportional to the frequency of the oscillator means and for actuating the amplitude means with the amplitude pulses to vary the DC potential between the rails.

* * * * *